Figure 1:
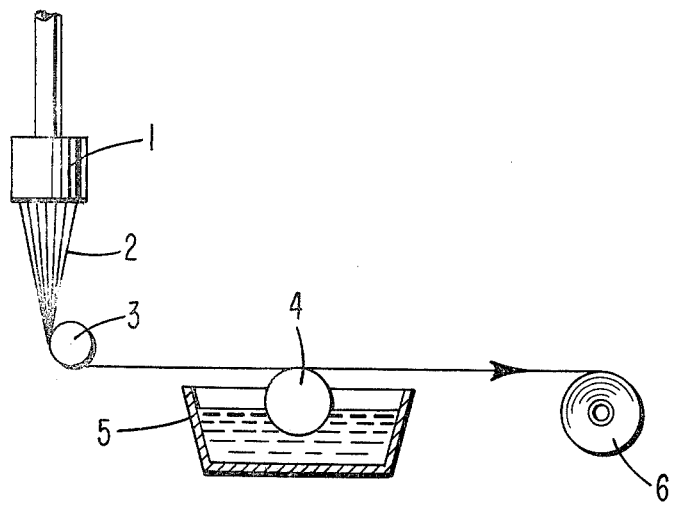

United States Patent [19]

Bourrain et al.

[11] 4,121,901

[45] Oct. 24, 1978

[54] SIZE COMPOSITION FOR IMPROVING THE ADHERENCE OF MULTIFILAMENT POLYMERIC YARNS TO SUBSTRATES SUCH AS RUBBER, AND METHODS USING SAME

[75] Inventors: Paul Bourrain, Ecully; Andre Pesson, Lyons, both of France

[73] Assignee: Rhone-Poulenc-Textile, Paris, France

[21] Appl. No.: 652,330

[22] Filed: Jan. 26, 1976

[30] Foreign Application Priority Data

Jan. 27, 1975 [FR] France .................................. 75 02684
Nov. 26, 1975 [FR] France .................................. 75 36426

[51] Int. Cl.² .................. D06M 13/10; D06M 13/34; B32B 25/08; B32B 25/10
[52] U.S. Cl. .................................... 8/115.6; 156/326; 427/207 R; 428/395
[58] Field of Search ................. 8/115.6, 190; 156/326; 428/395; 427/207

[56] References Cited

U.S. PATENT DOCUMENTS

| 3,028,385 | 4/1962 | Batzer et al. .......................... 260/248 |
| 3,247,043 | 4/1966 | Cardina ................................. 156/314 |
| 3,449,340 | 6/1969 | Orth et al. ............................ 260/248 |

FOREIGN PATENT DOCUMENTS

1,267,432  6/1961  France.
2,070,240  9/1971  France.

OTHER PUBLICATIONS

Japanese Application 74/040879, 11/68.

*Primary Examiner*—John Kight, III
*Attorney, Agent, or Firm*—Stevens, Davis, Miller & Mosher

[57] ABSTRACT

A size composition is described which is capable of increasing the adherence, and particularly the adherence to rubber, of multifilament yarns having a base of polyester, a base of polymers of high modulus of elasticity, or a base of thermostable polymers, wherein said size composition contains tris(epoxypropoxy 2,3)3-propionyl 1,3,5-hexahydro-s-triazine as preadhering agent, preferably present in an amount between 1 and 30% based on the weight of the size composition. The treated yarn is thereafter bonded to a desired substrate, such as rubber.

6 Claims, 4 Drawing Figures

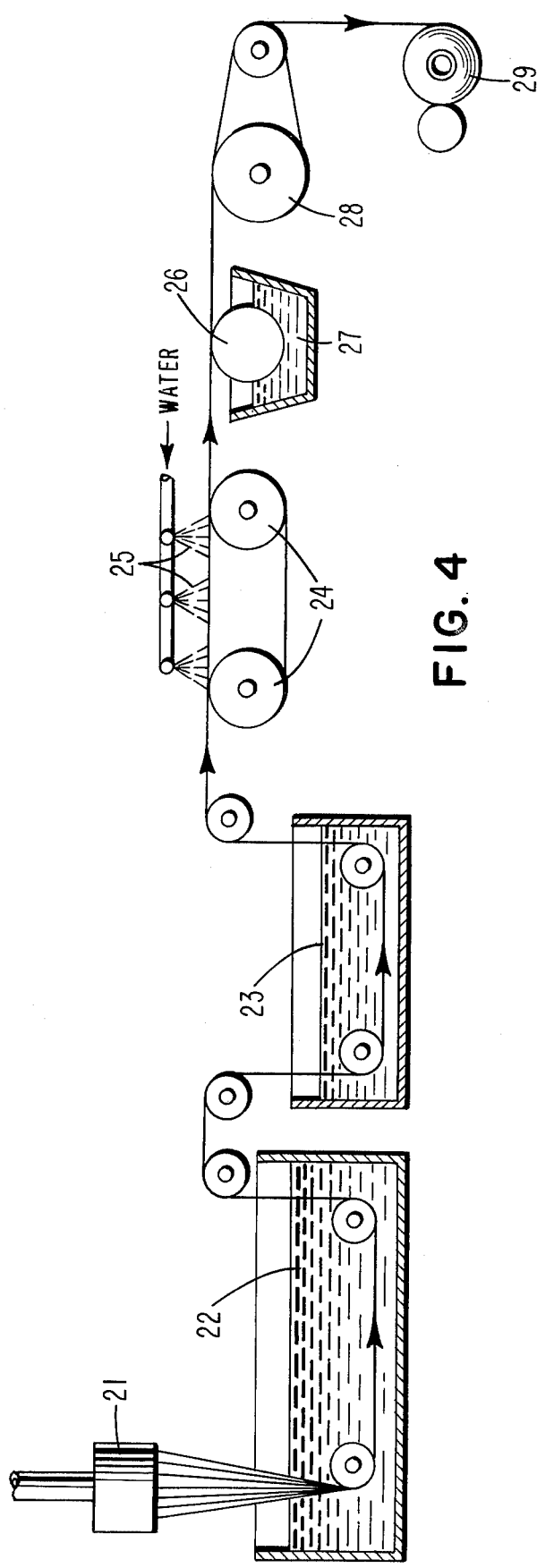
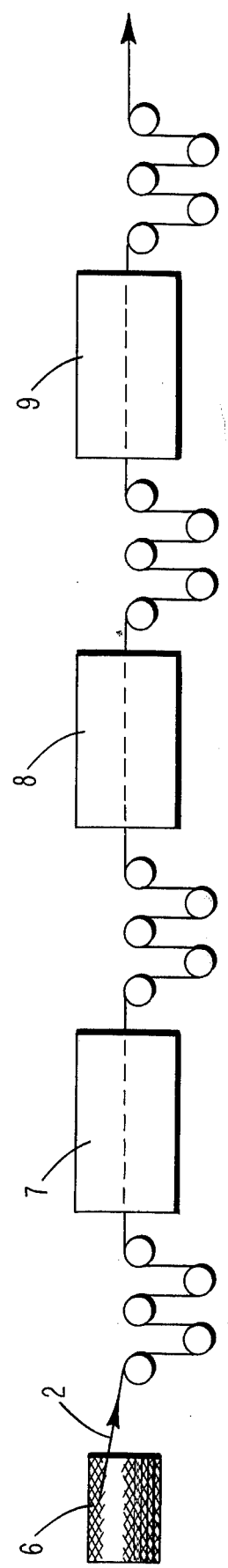

SIZE COMPOSITION FOR IMPROVING THE ADHERENCE OF MULTIFILAMENT POLYMERIC YARNS TO SUBSTRATES SUCH AS RUBBER, AND METHODS USING SAME

The present invention relates to a new sizing composition which contains a pre-adherence agent which makes it possible to increase the adherence, and particularly the adherence to rubber, of yarns such as polyester yarns which are particularly useful for the manufacture of tire cords, or polymer yarns of high modulus of elasticity, or yarns from thermostable polymers.

It has already been proposed to introduce one or more pre-adherence agents into a sizing composition which is to be applied to unstretched filaments in order to carry out two simultaneous operations in one step. However, most of the agents used for that purpose up to the present time do not give full satisfaction for the following reasons:

they are not sufficiently active and their use is possible only by adding to the sizing composition other compounds which generally result in the degradation of the mechanical properties of the filaments thus treated. This is true of the heterocyclic or aliphatic amines added to the glycidyl ethers used in the process described in the Patent of Addition No. 95,456 to French Pat. No. 1,427,719, the aromatic amines mentioned in the process described in Japanese application 72/38011, and the carboxylic acids mentioned in the process described in Japanese application 72/38012;

or, most of these pre-adherence agents are not miscible with the conventional sizing agents which are generally water-soluble and are applied in the form of an aqueous solution or emulsion. Well known insoluble pre-adherence agents are for instance those of the polyether-polyepoxide type derived from benzene such as 1,4 bis(2,3 epoxypropoxy) benzene; 1,3 bis(2,3 epoxypropoxy) benzene; 1,3 bis(4,5 epoxypentoxy) 5-chlorobenzene, etc.;

or else they adversely affect the dynamometric properties of the yarns treated.

It has now been found possible (in accordance with the present invention) to introduce into the sizing composition a special pre-adherence agent which does not have the drawbacks mentioned above.

The present invention concerns a new sizing composition which makes it possible to increase the adherence and particularly the adherence to rubber, whether natural or synthetic, of yarns having a base of polyester, or of polymers of high modulus of elasticity, or of thermostable polymers, wherein the composition is characterized by the fact that it contains tris(epoxypropoxy 2,3)3-propionyl-1,3,5-hexahydro-s-triazine as pre-adherence agent.

This compound, which is very soluble in water, has the formula:

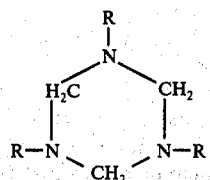

in which R is the (epoxypropoxy 2,3)3-propionyl-1,3,5-radical:

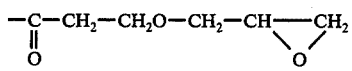

For brevity, this will be referred to hereinbelow simply as "triepoxide". It can be obtained by various methods. One such method consists in reacting one mol of triacryloyl 1,3,5-hexahydro-S-triazine (TAHHT), 3 mols of glycerol monochlorhydrin, and 3 mols of soda. Another method consists in reacting one mol of triazine with 3 mols of epoxy 2,3 propanol 1 in the presence of an alkaline catalyst. See also Batzer et al U.S. Pat. No. 3,028,385 for the triepoxide.

The pre-adherence sizing composition in accordance with the present invention is obtained by dissolving the triepoxide in a suitable sizing composition in aqueous solution or emulsion. The amount of soluble triepoxide introduced depends on various factors, particularly the nature of the size, the viscosity of the polymer treated, the amount of adherence which it is desired to impart to the treated material, and the method of depositing the sizing composition on the yarn. In general, this amount of the soluble triepoxide is between 1 and 30% by weight referred to the weight of the composition, and preferably between 2 and 10%.

The sizing agent contained in the composition may be selected from among the sizing agents customarily used to treat filaments provided, however, that they are soluble or emulsifiable in water. Mention may be made, for instance, of animal, vegetable or mineral oils, possibly sulfonated, ethylene oxide condensates or branched alcohols or fatty acids (hexaglycol stearate), etc. In addition to the sizing agent and the pre-adherence agent, the sizing composition may if desired contain still other additives, such as fungicides, solvents, emulsifiers, etc.

The composition in accordance with the present invention is advantageously applied to polyester-base filaments. By polyesters there are generally designated the polyesters and copolyesters derived from at least one aromatic diacid or an ester thereof, and if desired a small amount of an aliphatic diacid and at least one aliphatic cycloalkane or cycloaliphatic diol having from 2 to 10 carbon atoms in the molecule. The aromatic diacid is preferably terephthalic acid. Mention may also be made by way of example of isophthalic acid, dicarboxy-2,6-naphthalene, dicarboxy-4,4'-diphenyl, dicarboxy-4,4' diphenylsulfone, dicarboxy-4,4'-diphenoxy-1,2-ethane.

The polyester filaments treated by the sizing composition are then stretched in the hot in the customary manner. This stretching can be effected by passing them horizontally through heating furnaces, for instance in an installation such as that shown diagrammatically in FIG. 2 below.

The accompanying figures will assist further in an understanding of the invention.

FIGS. 1 and 2 taken together show diagrammatically a yarn spinning and treating operation.

Figure 3:
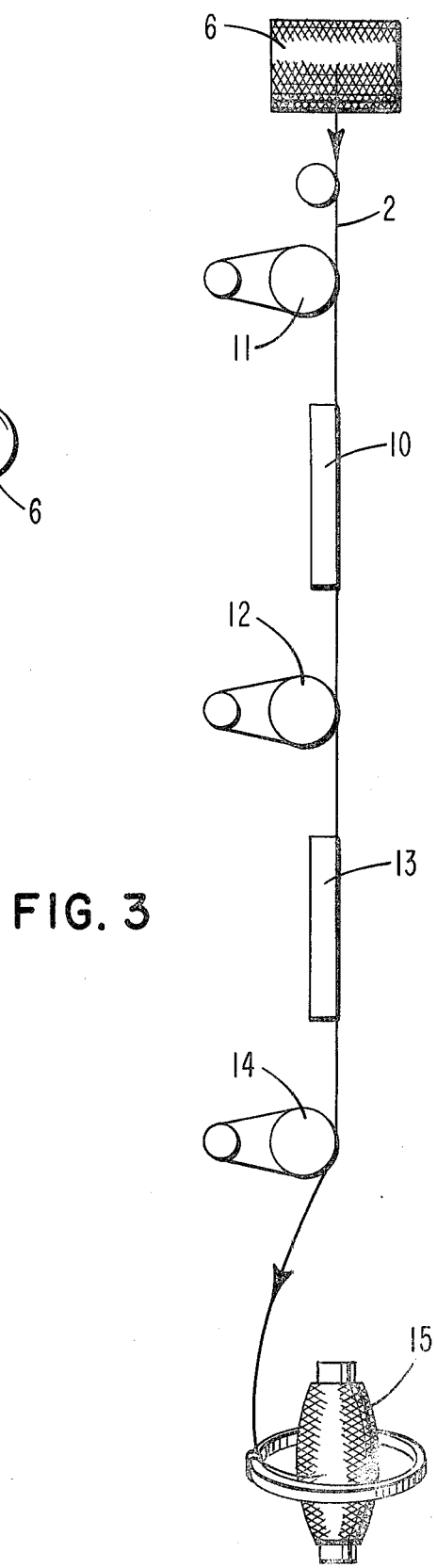

FIGS. 1 and 3 taken together show diagrammatically a modified yarn spinning and treating arrangement.

FIG. 4 shows diagrammatically still another arrangement involving wet-spinning of the yarn followed by the sizing treatment.

Referring to FIGS. 1 and 2, the yarn 2 which, upon emergence from the spinnerett 1 with the aid of take-up roller system 3, is sized and pre-adhered by passage over a cylinder 4 partially immersed in a vat 5 containing the sizing composition in accordance with the present invention and then wound up on the bobbin 6. The yarn is then passed through a first furnace 7 (FIG. 2) where it also undergoes a first stretching and then through a second furnace 8 where it also undergoes a second stretching, and then through a third furnace 9 where it is fixed and relaxed. The yarn is then wound up on cops in conventional manner (not shown).

The stretching can also be effected by vertical passage of the yarn over heating plates, for instance in an installation such as that shown diagrammatically in FIG. 3. There the yarn 2 (which has already been treated and wound onto the bobbin 6 as in FIG. 1) is brought, in succession, into contact with a stretching roller 11 where constriction is produced, a heating plate 10 located between two stretching rollers 11 and 12, and then with a second heating plate 13, and finally over a third stretching roller 14. The yarn is then wound up on the spindle 15.

The heat treatment combined with the stretching also has the effect of evaporating residual water and fixing the sizing composition on the filaments.

After stretching, the polyester filaments are treated in otherwise conventional manner, for instance before or after twisting, by an adhesive composition which generally consists essentially of a mixture of latex and resorcinol-formaldehyde resin (RFL bath) which is then hardened on the filaments by heat treatment. The polyester articles obtained can be used more particularly for the manufacture of tire cords.

The sizing composition of the present invention is also suitable for yarns having a base of polymers of high modulus whether those yarns are made from staple fibers or from continuous filaments.

By "high modulus" is to be understood a modulus of elasticity (or Young's modulus) which is greater than 300 g/1.1 tex (1 den) on the average, this modulus being measured in accordance with ASTM Standard D 2101, part 25, 1968.

This invention is applicable more particularly to fibers of high modulus which furthermore have a high tenacity and/or high energy of rupture, that is to say of at least 50 g/tex (0.9 den) and preferably at least 100 g/tex (0.9 den).

The fibers of high modulus are obtained by spinning polymers of inorganic origin such as carbon, glass or of organic origin which generally contain aromatic rings on which "rigid" radicals are fixed. As example of such polyers, mention may be made of the aromatic polyamides and more particularly those which are in paraposition, of the type of polyparaphenylene terephthalamide, or polyparabenzamide, the arylaliphatic polyamides or copolyamides of the type of hexamethylene polyparaphenylene terephthalamide or copolyamides having saturated, non-saturated and/or cycloalkane aromatic or aliphatic diacids and aromatic or aliphatic diamines, the copolyamides derived more particularly from terephthalic and adipic acids and tetramethylene or paraphenylene diamines such as described in French Patent Application 74/18524 filed by RHONE POULENC TEXTILE, the polyoxadiazoles such as polyarylene-1,3,4-oxadiazole, the copolyoxadiazoles obtained from a mixture of isophthalic and terephthalic acids or one of the latter and aliphatic or cycloalkane diacids, and the polymers having a base of PVA (polyvinyl alcohol) of high tenacy and high modulus of elasticity.

The present invention also applies to industrial yarns of the thermostable type, that is to say yarns which have a high resistance to heat (300°–350° C) and which have a base of polymers, either of the polyamide-imide type obtained from the reaction of a diamine or one of its derivatives with an acid anhydride or one of its derivatives, or of the aromatic polyamide type obtained by reaction of an aromatic diacid or one of its derivatives with a diamine or one of its derivatives, which polymers may if desired be modified by the introduction of acid groups.

The sizing composition in accordance with the present invention can be applied in any stage of manufacture of the yarn, irrespectively of the method of spinning used or the polymers treated.

It should also be pointed out that although the increase in the properties of adherence to rubber is one of the essential purposes of the present invention, the preadhering composition containing triepoxide may also increase the adherence to other products such as resins of the phenoplast, epoxy, polyester, thermostable type, etc., for the production of composite structures. In this case the sizing composition may be applied directly to films, woven fabrics, knitted fabrics, etc.

The advantages obtained by the introduction of the triepoxide of the present invention into the sizing composition are the following:

As the triepoxide is very soluble in water it is miscible in most sizing compositions.

It has numerous epoxide functions in its molecule which enable it to fix itself firmly to the treated yarn on the one hand and to the adhering composition on the other.

It is nonvolatile and therefore scarcely any loss by evaporation is noted before it is fixed on the yarn during the stretch-heat treatment.

It is very filmogenic, its deposition takes place in homogeneous manner, the adherence rate is practically constant over the entire surface of the filaments, and it withstands rubbing extremely well.

It does not affect the dynamometric properties of the treated filaments.

Its presence in certain sizing compositions facilitates the stretching.

Its synthesis is simple and it is obtained from low-priced raw materials.

Finally, the composition in accordance with the present invention makes it possible to obtain pre-adhered yarns with good output since two operations are effected simultaneously while the conventional methods heretofore known require two separate treatments.

The following examples are given by way of illustration and not of limitation, in order still further to explain the invention.

EXAMPLE 1

Polyethyleneglycolterephthalate filaments are produced by using the spinning device shown in FIG. 1 with horizontal stretching, such as shown in FIG. 2, in the following manner:

A polyethyleneterephthalate having an intrinsic viscosity of 0.8, and containing 30 mEq/kg of carboxyl groups, is extruded through a spinnerette 1 having 200 orifices of 0.34 mm diameter. At the outlet of the spinnerette, the filaments 2 which are collected on a roller 3, pass over the sizing cylinder 4 which dips into the vat 5 containing the pre-adhering sizing composition, and are then wound on the bobbin 6.

Stretching is thereafter effected under the following conditions:

The filaments are conducted for 11 seconds through the first furnace 7 having a length of 4 meters, heated to 95°–110° C, where they are stretched by a factor of 3.2; and then into the second furnace 8, having a length of 10 meters, for 14 seconds, having 5 zones of increasing temperature of 195°–205°–210°–220°–230° C, where they are stretched by a factor of 6.5; and finally they are passed through the third furnace 9 having a length of 4 meters, heated to 240° C, where the stretch factor is 6; they are then wound on cops.

Tests were carried out by introducing into the vat 5 various sizing compositions containing known pre-adherence agents and comparing them with those obtained with sizing compositions containing the triepoxide of the present invention. The amount of sizing composition deposited on the filaments was 1% in each test. The products used were as follows:

As sizing agent:
(A) A composition containing by weight:
  55.6% of a mineral oil;
  21% of a sulfonated oil;
  10% olein;
  2.25% diethylene glycol;
  1.1% potash
  4.9% triethanolamine;
  4.75% hexaglycol stearate;
  0.4% Na pentachlorophenate;
which will be referred to hereinbelow for purposes of simplification as "sizing A".

(B) A composition containing essentially 45% of heavy aliphatic esters and 50% of polyoxyethylene glycol esters, and sold by the STOCKHAUSEN COMPANY under the trade name Estesol NCW.

(C) A composition containing essentially 45% of heavy aliphatic esters including pentaerythritol oleate and 50% of polyoxyethylene glycol, and sold by the STOCKHAUSEN COMPANY under the trade name Estesol TX 5233.

As pre-adhering agent:
(a) Epikote 812 sold by the SHELL COMPANY and which has the formula:

$$CH_2-CH-CH_2\left[-O-CH_2-CH-CH_2-O-CH_2-CH-CH_2\right]_n -O-CH_2-CH-CH_2-O-CH_2-CH-CH_2$$
$$\underset{O}{\diagdown\diagup} \quad\quad\quad OH \quad\quad\quad OH \quad\quad\quad\quad\quad OH \quad\quad\quad \underset{O}{\diagdown\diagup}$$

(b) The Carbamat sold by the STOCKHAUSEN COMPANY which is a 50% solution in water of a compound having a dithiocarbamic structure.
(c) The triepoxide in accordance with the present invention.

Test No 1: Size A + Epikote 812. The composition is prepared in the following manner:
  for 1000 g of solution there are dissolved in 705 g of water: 120 g of Size A, 125 g of N-methyl-2-pyrrolidone, and 50 g of Epikote 812.

The concentration of size in the composition is 12% by weight and the concentration of Epikote is 5% by weight.

Test No. 2: Size A + Carbamat. The composition is prepared in the following manner:
  for 1000 g of solution there are dissolved in 860 g of water at 40° C: 20 g of Carbamat and 120 g of Size A.

The concentration of size in the composition is 12% by weight and of Carbamat 2%.

Test No. 3: Size A + triepoxide. The composition is prepared in the following manner:
  for 1000 g of solution there are dissolved in 830 g of water: 50 g of triepoxide and 120 g of Size A.

The concentration of size in the composition is 12% by weight and of triepoxide 5%.

Test No. 4: Estesol NCW + Epikote 812. The composition is prepared in the following manner:
  for 1000 g of solution there are dissolved in 830 g of water: 50 g of Epikote 812 and 120 g of Estesol NCW size.

The concentration of size in the composition is 12% by weight and of Epikote 812 5%.

Test No. 5: Estesol NCW + Carbamat. The composition is prepared in the following manner:
  for 1000 g of solution there are dissolved in 860 g of water at 40° C: 20 g of Carbamat and 120 g of Estesol NCW size.

The concentration of size in the composition is 12% by weight and of Carbamat 2%.

Test No. 6: Estesol NCW size + triepoxide. The composition is prepared in the following manner:
  for 1000 g of solution there are dissolved in 830 g of water: 50 g of triepoxide and 120 g of Estesol NCW size.

The concentration of size in the composition is 12% by weight and of triepoxide 5%.

Test No. 7: Estesol TX 5233 size + Carbamat. The composition is prepared in the following manner:
  for 1000 g of solution, there are dissolved in 851 g of water at 40° C: 20 g of Carbamat and 129 g of Estesol TX 5233 of 97%.

The concentration of size in the composition is 12% by weight and of Carbamat 2%.

Test No. 8: Estesol TX 5233 size + triepoxide. The composition is prepared in the following manner:
  for 1000 g of solution there are dissolved in 821 g of water: 50 g of triepoxide and 129 g of Estesol TX 5233.

The concentration of size in the composition is 12% by weight and of triepoxide 5%.

The dynamometric properties of the sized and pre-adhered yarns obtained are measured after stretching (tests 1 to 8), as indicated in the following Table I:

TABLE I

| Test No. | 1 | 2 | 3 | 4 | 5 | 6 | 7 | 8 |
|---|---|---|---|---|---|---|---|---|
| Size | Size A + Epikote 812 | Size A + Carbamat | Size A + triepoxide | Estersol NCW + Epikote 812 | Estesol NCW + Carbamat | Estesol NCW + triepoxide | Estesol TX 5233 + Carbamat | Estesol TX 5233 + triepoxide |
| Load in g | 4273 | 9117 | 9015 | 6274 | 7897 | 8857 | 7759 | 8111 |
| Tenacity g/tex | 31.3 | 84.8 | 86.5 | 51.6 | 80.2 | 80.6 | 69.6 | 73.4 |
| Elongation in % | 19.8 | 11.6 | 11.2 | 13.8 | 11.6 | 12.0 | 14.9 | 16.1 |
| Shrinkage 150° C dry air | 7.8 | 4.5 | 5.1 | 10.3 | 5.3 | 4.8 | 3.7 | 3.6 |

The breaking load, the tenacity, and the elongation were measured with an INSTRON dynamometer on a 50 cm. length of yarn in accordance with the BISFA Standard. The shrinkage was measured in dry air over a 50 cm. length of yarn in the free state and in a ventilated stove.

The dynamometric properties were measured on pre-adhered cables, which is indicated in the following Table II, the twist being 1110/1/2 effected in 500 Z/S (see below).

The dynamometric properties are measured on adhered cables and indicated in Table III below, the adhering of the cables being effected under the following conditions:

the twisted yarn is immersed in an adhering bath containing 600 g of water, 52.5 g of resorcinol and 95 g of 3% formaldehyde, 710 g of 40% vinyl pyridine latex sold by the PLASTIMER COMPANY under the name "UGITEX", 135 g of 60% natural latex and 115 g of styrene-butadiene latex sold by the FIRESTONE COMPANY under the name of "LATEX 1357" in a concentration of 36%. Drying is effected at 140° C for 30 seconds by passing the twisted yarn at a speed of 18 m/min and with 5% overstretch through a first furnace and then into a cross-linking furnace at 225° C for 40 seconds with 3% overstretch.

Finally, the adherence of the twisted yarns to rubber is measured (test H) in accordance with the BISFA Standard, which consists in vulcanizing, after 24 hours of rest, at 145° C for 45 minutes onto the two ends of the cable a test piece of rubber of the following composition, the amounts being given in parts by weight:

| | |
|---|---|
| smoked sheets | 100 |
| carbon black EPC | 43 |
| zinc oxide | 5 |
| stearine | 2 |
| pine tar | 2 |
| antioxidant MC (phenyl-β-naphthylamine) | 1 |
| benzothiazyl disulfide | 0.8 |
| sulfur | 3 |

After setting aside for 24 hours, the force necessary to detach the twisted yarn from the test piece is measured on a horizontal INSTRON dynamometer of the gradient type with constant elongation, the length of tear of the twisted yarn in the rubber having been fixed at 5 mm. The average measurement for 30 tests is given. The results are set forth in Table IV.

TABLE II

| Test No. | 1 | 2 | 3 | 4 | 5 | 6 | 7 | 8 |
|---|---|---|---|---|---|---|---|---|
| Size | Size A + Epikote 812 | Size A + Carbamat | Size A + triepoxide | Estesol NCW + Epikote 812 | Estesol NCW + Carbamat | Estesol NCW + triepoxide | Estesol TX 5233 + Carbamat | Estesol TX 5233 + triepoxide |
| Torsion Count in dtex measured on 1 m | 504/492 | 489/498 | 491/498 | 488/491 | 488/484 | 483/459 | 491/484 | 490/493 |
| | 3190 | 2390 | 2420 | 2695 | 2310 | 2335 | 2500 | 2500 |
| Load in g | 9620 | 14480 | 13750 | 13610 | 14560 | 13865 | 15220 | 14750 |
| Tenacity g/tex | 30.2 | 60.6 | 56.9 | 50.5 | 63.0 | 59.4 | 60.8 | 59.0 |
| Elongation in % | 27.0 | 14.5 | 13.5 | 17.2 | 15.8 | 14.9 | 20.2 | 20.5 |
| Shrinkage 150° C dry air | 7.7 | 5.6 | 6.6 | 13.6 | 5.0 | 5.2 | 5.1 | 4.9 |
| Loss of load upon twisting-preadhered twisted yarn/preadhered untwisted yarn in % | 10.9 | 18.7 | 19.5 | 1.8 | 10.8 | 18 | 2.4 | 8.7 |

TABLE III

| Test No. | 1 | 2 | 3 | 4 | 5 | 6 | 7 | 8 |
|---|---|---|---|---|---|---|---|---|
| Size | Size A + Epikote 812 | Size A + Carbamat | Size A + triepoxide | Estesol NCW + Epikote 812 | Estesol NCW + Carbamat | Estesol NCW + triepoxide | Estesol TX 5233 + Carbamat | Estesol TX 5233 + triepoxide |
| Torsion | 506/477 | 493/480 | 494/480 | 498/484 | 497/482 | 490/478 | 497/479 | 495/478 |
| Count in dtex | 3280 | 2430 | 2475 | 2835 | 2420 | 2450 | 2575 | 2600 |
| Load in g | 10670 | 13430 | 12785 | 11180 | 13040 | 11890 | 13490 | 13100 |
| Tenacity g/tex | 32.6 | 55.3 | 50.7 | 39.5 | 53.6 | 48.5 | 52.3 | 50.4 |
| Elongation in % | 25.6 | 12.1 | 11.3 | 13.5 | 12.8 | 12.0 | 12.5 | 12.2 |
| Shrinkage 150° C dry air | 3.0 | 4.7 | 5.7 | 4.7 | 5.1 | 4.9 | 5.1 | 4.9 |
| Adherence percentage | 5.8 | 6.0 | 6.1 | 5.8 | 5.0 | 5.1 | 6.4 | 7.0 |

TABLE III-continued

| Test No. | 1 | 2 | 3 | 4 | 5 | 6 | 7 | 8 |
|---|---|---|---|---|---|---|---|---|
| Size | Size A + Epikote 812 | Size A + Carbamat | Size A + triepoxide | Estesol NCW + Epikote 812 | Estesol NCW + Carbamat | Estesol NCW + triepoxide | Estesol TX 5233 + Carbamat | Estesol TX 5233 + triepoxide |
| Loss upon adhering: adhered yarn/preadhered yarn | 10.9 | 7.3 | 7.0 | 17.8 | 10.4 | 13.1 | 11.4 | 11.2 |

TABLE IV

| Test No. | 1 | 2 | 3 | 4 | 5 | 6 | 7 | 8 |
|---|---|---|---|---|---|---|---|---|
| Size | Size A + Epikote 812 | Size A + Carbamat | Size A + triepoxide | Estesol NCW + Epikote 812 | Estesol NCW + Carbamat | Estesol NCW + triepoxide | Estesol TX 5233 + Carbamat | Estesol TX 5233 + triepoxide |
| Adherence H kg/5mm | 11.5 | 5.7 | 9.2 | 11.5 | 9.1 | 9.4 | 8.1 | 10.0 |
| Number of measurements | 30 | 30 | 30 | 30 | 30 | 30 | 30 | 30 |
| Standard difference | 0.9 | 1.4 | 1.0 | 1.4 | 1.4 | 1.4 | 1.0 | 1.2 |

On the basis of these tests, one arrives at the following conclusions:
- the triepoxide is miscible in the three sizing compositions; the adherence to rubber of the treated yarns is good, as are the dynamometric properties.

On the other hand:
- Epikote 812 is soluble only in Estesol NCW. The adherence to rubber is good but the dynamometric properties of the treated yarns are less good (the Epikote 812 was solubilized in composition A by the addition of N-methyl pyrrolidone, but in this case one notes a substantial decline in the dynamometric properties of the yarns).
- Carbamat is miscible in the three sizing compositions but the adherence to rubber is poor although the dynamometric properties of the yarns are good.

EXAMPLE 2

Polyethyleneglycolterephthalate filaments are produced by using the spinning device shown in FIG. 1 in combination with the vertical stretching device shown in FIG. 3, under the following conditions:

A polymer identical to that of Example 1 is extruded in the manner indicated in Example 1. At the outlet of the spinnerette the filaments are sized and preadhered by means of the following sizing composition contained in the vat 5:

| size A | 200 parts by weight |
|---|---|
| triepoxide | 70 parts by weight |
| water | 730 parts by weight. |

The deposition of the sizing composition on the filaments is from 0.6 to 0.8%.

Stretching is effected in the following manner: the yarn passes over the stretching train 11 heated to 72° C, over the heating plate 10 of a length of 0.4 m heated to 130° C, over the second stretching train 12 heated to 130° C, over the heating plate 13 of a length of 0.4 m heated to 220° C, and then over the third unheated stretching train 14, the stretch factors being 1.008, 5.285 and 0.08 respectively. The yarn is wound onto the spindle 15 at 300 m/min.

The dynamometric characteristics of the sized and preadhered yarn obtained after stretching are measured as described above in Example 1, and compared with those of an identical control yarn treated under otherwise the same conditions except that the sizing composition does not contain triepoxide. The results are indicated in Table V.

The dynamometric properties of the preadhered twisted yarn are measured and compared with those of an identical control twisted yarn obtained from filaments which are identical but treated with a sizing composition otherwise identical but without the triepoxide, the twisting being effected in the same manner as in Example 1. The results are indicated in Table VI.

The dynamometric properties of the adhered cable are measured in the manner set forth in Example I, as well as the adherence H. The results are indicated in Table VII.

TABLE V

| | Count in dtex | Load in g | Tenacity g/tex | Elongation in % | Shrinkage at 190° C dry air |
|---|---|---|---|---|---|
| Control: yarn treated with Size A only | 1075 | 7535 | 70 | 8.4 | 15.3 |
| Test No. 9: yarn treated with Size A + triepoxide | 1105 | 8000 | 72.5 | 8.7 | 15.7 |

TABLE VI

| | Count in dtex | Load in g | Tenacity g/tex | Elongation in % | Shrinkage at 190° C dry air | Loss upon twisting |
|---|---|---|---|---|---|---|
| Control | 2400 | 13150 | 54.8 | 11.4 | 18.7 | 12.7 |
| Test No. 9 | 2430 | 13100 | 53.3 | 11.9 | 19.9 | 18.1 |

TABLE VII

| | Count in dtex | Load in g | Tenacity g/tex | Elongation in % | Shrinkage at 190° C dry air | Loss Upon Adherence | Adherence H |
|---|---|---|---|---|---|---|---|
| Test No. 9 | 2545 | 11880 | 46.7 | 9.0 | 10.0 | 9.3 | 10.7 |

It is to be particularly noted that the presence of the triepoxide in the sizing composition does not affect the dynamometric properties of the yarns and twisted yarns and that the adherence to rubber is good.

EXAMPLE 3

Polyethyleneglycolterephthalate filaments are manufactured as in Example 2, except that the spinnerete has 140 orifices of 0.48 mm in diameter and that the preadhering sizing composition is as follows:

| Estesol TX 5233 size | 200 parts by weight |
|---|---|
| triepoxide | 100 parts by weight |
| water | 700 parts by weight. |

The deposition of the sizing composition on the filaments is 0.8%. The filaments are stretched as in Example 2.

The dynamometric characteristics of the sized and preadhered filaments are measured after the stretching on preadhered twisted yarn and on adhered twisted yarn and finally the adherence (H) to rubber is measured under the same conditions as in Example 2. The results are indicated in the following Tables VIII, IX and X.

TABLE VIII

| | Count in dtex | Load in g | Tenacity g/tex | Elongation in % | Shrinkage at 190° C dry air |
|---|---|---|---|---|---|
| Control: yarn treated with Estesol TX 5233 size | 1095 | 6960 | 63.5 | 7.1 | 15.5 |
| Test No. 10: yarn treated with Estesol TX 5233 size + triepoxide | 1110 | 7540 | 67.9 | 8.0 | 15.7 |

TABLE IX

| | Count in dtex | Load in g | Tenacity g/tex | Elongation in % | Shrinkage at 190° C dry air | Loss upon twisting |
|---|---|---|---|---|---|---|
| Control | 2430 | 13210 | 54.3 | 11.7 | 19.1 | 5.2 |
| Test No. 10 | 2435 | 13330 | 54.7 | 12.2 | 20.6 | 11.6 |

TABLE X

| | Count in dtex | Load in g | Tenacity g/tex | Elongation in % | Shrinkage at 190° C dry air | Loss Upon Adherence | Adherence |
|---|---|---|---|---|---|---|---|
| Test No. 10 | 2555 | 12370 | 48.4 | 10.3 | 10.6 | 7.2 | 6.8 |

As in Example 1, it is to be noted that the presence of the triepoxide in the sizing composition does not affect the dynamometric properties of the yarns and twisted yarns and that the adherence to rubber is good, taking into account the size used.

EXAMPLE 4

(a) Preparation of the control

Polyparaphenyleneterephthalamide filaments are spun by the wet method in an installation shown schematically in FIG. 4.

In this figure, the solution of polymer in the spinning solvent is extruded through a spinnerette 21 and the filaments then pass through a coagulation bath 22 (5% solution of sulfuric acid). The filaments thus obtained are immersed in a neutralization bath in tank 23 having a sodium bicarbonate base and then pass over rollers 24 where they are washed by spraying with water 25, heated to 50° C. The filaments thus obtained, of 450 dtex (430 denier)/300 ends, are brought into contact with a cylinder 26 which dips into a vat 27 containing an aqueous sizing composition containing 12% by weight of a mixture of 45% of heavy aliphatic esters and 50% of polyethylene glycol esters, which is marketed under the name ESTESOL NCW by the STOCKHAUSEN COMPANY. The concentration of size is 1%. After drying on the drying cylinder 28 at 165° C average temperature for 12 seconds and then winding on the bobbin 29, the filaments are preadhered by immersion in a bath of the following composition:

| water at 28° C | 85 parts by weight |
|---|---|
| pyrrolidone-2 | 10 parts by weight |
| 5% solution of dioctylsulfosuccinate | 2 parts by weight |
| Epikote 812 sold by the SHELL COMPANY | 2 parts by weight |
| 10% NaOH solution | 1 part by weight |

The sizing composition deposited on the filaments is 0.6%.

The filaments are passed with a tension of 1 g per 1.1 dtex through a hot air circulation furnace at 160° C for 60 seconds.

The dynamometric properties of the filaments which have been sized, adhered and pretwisted to 120 Z are indicated in the following Table XI.

TABLE XI

| | Count in dtex | Load in g | Tenacity g/tex | Elongation in % | Shrinkage at 150° C dry air | Modulus of Elasticity g/tex |
|---|---|---|---|---|---|---|
| yarn sized then preadhered & retwisted | 475 | 9375 | 196 | 2.5 | 0.3 | 5488 |

The filaments are then assembled in groups of four, twisted to 340 Z and then twisted to 340 S, in order to obtain a twisted yarn of 1800 dtex (1637 denier) ¼, which is adhered by immersion in an RFL adhering bath containing 200 g/l of solids and the composition of which is as follows:

| "permutitized" water (25° C) | 250 g |
|---|---|
| caustic soda 1.67% solution | 20 g |
| resorcinol, in flakes | 12.5 g |
| 37% formaldehyde solution | 18.2 g |

The time and aging temperature of the solution are 6 hours and 24° C, respectively.

The foregoing composition is added to a bath containing 275 g of vinylpyridine latex, 70 g of water, and 13 g of sodium hydroxide. The bath is permitted to remain for 24 hours at 10° C. After immersion of the cord or twisted yarn in the bath, it is then passed under a tension of 1 g per 1.1 dtex into a first furnace heated at 230° C for 60 seconds and then in a second furnace at 230° C for 60 seconds under a tension of 0.3 g/ 1.1 dtex.

The average measurement (30 tests) of the adherence of the cable to the rubber (H test) is 7.6 kg/ 5 mm.

(b) Preparation of yarns which have been sized and preadhered with the composition of the present invention Polyparaphenylene terephthalamide filaments are prepared in the manner described above except that the aqueous composition contained in the vat 27 contains 12% by weight of ESTESO1 NCW and 6% by weight of polyepoxide. The size concentration is 1%.

The dynamometric properties of the filaments which have been simultaneously sized and preadhered and then twisted to 120 Z, substantially identical to those of filaments sized and then preadhered as in (a) above, are set forth in the following table XII:

TABLE XII

| | Count in dtex | Load in g | Tenacity g/tex | Elongation in % | Shrinkage at 150° C dry air | Modulus of Elasticity g/tex |
|---|---|---|---|---|---|---|
| Filaments sized, pre-adhered & twisted | 435 | 8670 | 199 | 2.9 | 0.3 | 5450 |

After twisting to 1800 dtex (1637 denier) ½ as in (a), the twisted yarn is adhered under identical conditions. The measure of adherence in the H test is 8 kg/5 mm.

The sizing composition in accordance with the present invention makes it possible to arrive at a result substantially identical to those obtained by a conventional two-step sizing and adhering process, but to do so much more rapidly. Moreover, the sizing composition in accordance with the present invention does not affect the dynamometric properties of the treated yarns.

What is claimed is:

1. A size composition capable of increasing the adherence, and particularly the adherence to rubber, of yarns having a base of polyester, a base of polymers of high modulus of elasticity, or a base of thermostable polymers, wherein said size composition contains tris-(epoxy-propoxy 2,3)3-propionyl 1,3,5-hexahydro-s-triazine as preadhering agent.

2. A size composition according to claim 1, wherein the amount of tris(epoxy-propoxy 2,3)3-propionyl 1,3,5-hexahydro-s-triazine is between 1 and 30% based on the weight of the size composition.

3. A method for increasing the adherence, and particularly the adherence to rubber, of yarns having a base of polyester, a base of polymers of high modulus of elasticity, or a base of thermostable polymers, comprising treating said yarns with a size composition containing tris(epoxy-propoxy 2,3)3-propionyl 1,3,5-hexahydro-s-triazine as preadhering agent.

4. A method according to claim 3, wherein the amount of tris(epoxy-propoxy 2,3)3-propionyl 1,3,5-hexahydro-s-triazine is between 1 and 30% based on the weight of the size composition.

5. A method for increasing the adherence to rubber of a yarn having a base of polyester, a base of polymers of high modulus of elasticity, or a base of thermostable polymers, comprising treating said yarn with a size composition containing tris(epoxy-propoxy 2,3)3-propionyl 1,3,5-hexahydro-s-triazine as preadhering agent, and thereafter bonding said yarn to rubber.

6. A method according to claim 5, wherein the amount of tris(epoxy-propoxy 2,3)3-propionyl 1,3,5-hexahydro-s-triazine is between 1 and 30% based on the weight of the size composition.

* * * * *